United States Patent [19]

Pelliconi et al.

[11] Patent Number: 5,623,021

[45] Date of Patent: Apr. 22, 1997

[54] CRYSTALLINE PROPHYLENE COPOLYMER COMPOSITIONS HAVING A LOW SEAL TEMPERATURE AND GOOD INK ADHESION

[75] Inventors: Anteo Pelliconi, Rovigo; Giampaolo Pellegatti, Ferrara; Paolo Vincenzi, Rovigo, all of Italy

[73] Assignee: Montell North America Inc., Wilmington, Del.

[21] Appl. No.: 409,364

[22] Filed: Mar. 23, 1995

[30] Foreign Application Priority Data

Mar. 24, 1994 [IT] Italy ................... MI94A0565

[51] Int. Cl.$^6$ ................... C08L 23/00
[52] U.S. Cl. ................... 525/240; 524/515; 525/191
[58] Field of Search ................... 525/191, 240; 524/515

[56] References Cited

U.S. PATENT DOCUMENTS 4,652,489  3/1987  Crass et al. ................... 428/337
4,842,930  6/1989  Schinkel et al. ................... 428/349
5,296,548  3/1994  Covezzi et al. ................... 525/322

FOREIGN PATENT DOCUMENTS 187253  7/1986  European Pat. Off. .
255622  2/1988  European Pat. Off. .
447953  9/1991  European Pat. Off. .

*Primary Examiner*—Edward J. Cain

[57] ABSTRACT

Disclosed are a crystalline propylene copolymer composition, film, sheet and plate made therefrom and laminates wherein at least one layer is made therefrom, having low seal initiation temperature and good ink adhesion properties. The composition comprises (percent by weight):

A) 20–60% of a crystalline copolymer of propylene with 1 to 5% ethylene; and

B) 40–80% of a crystalline copolymer of propylene with 1 to 5% ethylene and 6 to 15% $C_4$–$C_8$ $\alpha$-olefin.

In the composition the total content of ethylene being 1% to 5% and of $C_4$–$C_8$ $\alpha$-olefin being 2.4% to 12%.

11 Claims, No Drawings

CRYSTALLINE PROPHYLENE COPOLYMER COMPOSITIONS HAVING A LOW SEAL TEMPERATURE AND GOOD INK ADHESION

The present invention relates to a crystalline propylene polymer composition useful in the preparation of heat-sealable and ink printable films, sheets and laminates thereof and to a process for preparing said composition.

The use of crystalline copolymers of propylene with other alpha-olefins (mainly ethylene, 1-butene or both), or mixtures of such copolymers with other olefin polymers are known in the art, as materials possessing certain thermosealing properties. These crystalline copolymers are obtained by polymerizing propylene with minor amounts of other alpha-olefin comonomers in the presence of coordination catalysts. The polymerized comonomer units are statistically distributed in the resulting copolymer and the melting point of said copolymer is lower than the melting point of crystalline propylene homopolymers. However, the introduction of the comonomer units adversely affects the crystal structure of the polymer, which results in relatively high quantities of a polymer fraction soluble in cold xylene at room temperature (25° C.). Consequently, the mechanical properties of the polymer are adversely affected, and when it is used for the preparation of multilayer films and laminates, by coextrusion with crystalline propylene homopolymer for example, some problems can arise from incompatibility with the polypropylene layer, resulting in unsatisfactory seal strength. Moreover, the presence of relatively large quantities of xylene solubles causes the polymer to be easily attacked by organic substances, rendering it unsuitable for use in the manufacture of packaging for food products.

The disadvantages set forth above cannot be easily overcome by using mixtures of said crystalline copolymers of propylene or mixtures thereof with other olefin polymers, because the heat seal properties seem to be connected to the nature and relative quantities of the crystalline fractions and of the fraction soluble in xylene at room temperature, and probably to the distribution of the fractions within the polymer material.

Moreover, the production of the mixtures by mechanically melt blending is more expensive than the formation of mixtures or blends in polymerization in terms of time and energy (due to the melt extrusion and pelletization, for example) in order to obtain a homogeneous dispersion of the components. In addition, production by mechanically melt blending provides a polymer composition with a heat history as evidenced by a certain amount of thermal degradation, which is avoided with polymer compositions prepared in polymerization.

Published European patent application 483523 describes compositions prepared directly in a polymerization process, having a low heat-seal initiation temperature as well as a low content of a fraction soluble in xylene at room temperature or n-hexane at 50° C. These compositions comprise (by weight):

A) 30–65% of a copolymer of 80 to 98% propylene with a $C_4$–$C_8$ α-olefin;

B) 35–70% of a copolymer of propylene with ethylene and optionally 1 to 10% of a $C_4$–$C_8$ α-olefin, wherein the content of ethylene in the copolymer is from 5 to 10% when the $C_4$–$C_8$ α-olefin is not present, or said ethylene content ranges from 0.5 to 5% when the $C_4$–$C_8$ α-olefin is present.

However, as it will be shown hereinafter in the examples, the above composition has low ink adhesion levels even after the surface to be printed has been subjected to intense surface treatments. For example, when the surface of a film prepared from the composition is modified by corona treatment, the electric voltage required to generate a corona with energy sufficient to achieve some degree of ink adhesion to the surface is so high that it creates problems such as film perforation and an increase in the heat-seal initiation temperature property of the film.

Ink adhesion is an important property for heat-sealable polyolefin compositions, because they are often used in the production of multilayer films for packaging, where both outer layers are made of the above mentioned compositions, and in many cases, particularly in food packaging field, there is a need to print on said films.

This invention provides a solution to these problems, by providing a composition comprising a copolymer of propylene with ethylene and a copolymer of propylene with ethylene and a $C_4$–$C_8$ α-olefin, wherein the total content of ethylene and $C_4$–$C_8$ α-olefin in the composition is within certain limits, which composition not only displays a low heat-seal initiation temperatures and contains a low quantity of a fraction soluble in n-hexane at 50° C., but also has good ink adhesion.

The above combination of properties cannot be achieved with copolymers of propylene with $C_4$–$C_8$ α-olefin, because the quantities of $C_4$–$C_8$ alpha-olefins necessary to obtain low heat-seal initiation temperatures are so high that ink adhesion to products made therefrom becomes very difficult to achieve. This also is the case for the compositions of published European patent application 483523. On the other hand, when one uses only propylene/ethylene copolymers or propylene/ethylene/$C_4$–$C_8$ α-olefin terpolymers, the above mentioned disadvantages occur.

The crystalline propylene copolymer composition of the present invention comprises (percent by weight):

A) 20–60%, preferably 30–50%, of a copolymer of propylene with ethylene, containing 1% to 5%, preferably 2% to 4% of ethylene;

B) 40–80%, preferably 50–70%, of a copolymer of propylene with ethylene and a $C_4$–$C_8$ α-olefin, the ethylene content being 1% to 5%, preferably 2% to 4%, and the $C_4$–$C_8$ α-olefin content being 6% to 15%, preferably 7% to 12%;

the total content of ethylene in the composition being 1% 5%, preferably 2% to 4%, and the total content of $C_4$–$C_8$ α-olefin in the composition being 2.4% to 12%, preferably 3.5% to 8.4%.

The $C_4$–$C_8$ α-olefin is preferably of 1-butene, 1-pentene, 1-hexene, 4-methyl-1-pentene and 1-octene. Particularly preferred is 1-butene.

As will be shown in the examples, a film formed from the above composition requires moderate surface modification treatment to obtain ink adhesion. For example, if the surface is modified by corona treatment, the voltage needed to generate a corona with sufficient energy to result in a given level of ink adhesion is lower than the voltage needed for the composition of published European patent application 483523, even when the ink is applied days after the surface has been modified, as is in practice the case.

Moreover, the composition of the present invention has preferably the following properties: a melting point from about 126° C. to 147° C.; seal initiation temperature (as defined below) from 90° C. to 114° C.; and a fraction soluble in n-hexane at 50° C. of less than 5.5% by weight.

"Seal initiation temperature", or S.I.T., (also referred to herein as heat-seal temperature) is the minimum temperature needed to form a seal of one polypropylene film layer to one film layer prepared from the composition of the invention, so that the seal does not fail, i.e. the film layers do not separate at the seal, when a 200 g load is applied to this multilayer film. The particulars will be given in the examples.

The composition of the invention can be prepared by sequential polymerization of the monomers in the presence of stereospecific Ziegler-Natta catalysts. An essential component of said catalysts is a solid catalyst component comprising a titanium compound having at least one titanium-halogen bond, and an electron donor compound, both supported on a magnesium halide in active form. Another essential component is an organoaluminum compound, such as an aluminum alkyl compound.

The catalysts used in the process of the invention are capable of producing polypropylene with an isotactic index greater than 90%, preferably greater than 95%. Catalysts having the above mentioned characteristics are well known in patent literature.

Particularly advantageous are the catalysts described in U.S. Pat. No. 4,339,054 and European patent 45,977. Other examples of catalysts are described in U.S. Pat. Nos. 4,472,524 and 4,473,660.

The solid catalyst components used in said catalysts comprise, as electron donors, compounds selected from the group consisting of ethers, ketones, lactones, compounds containing N, P and/or S atoms, and esters of mono- and dicarboxylic acids.

Particularly suitable electron donors are phthalic acid esters, such as diisobutyl, dioctyl, diphenyl and benzylbutyl phthalate; malonic acid esters such as diisobutyl and diethyl malonate; alkyl and aryl pivalates; alkyl, cycloalkyl and aryl maleates; alkyl and aryl carbonates such as diisobutyl carbonate, ethyl phenyl carbonate and diphenyl carbonate; and succinic acid esters, such as mono and diethyl succinate.

Other electron donors particularly suitable are 1,3-diethers of formula

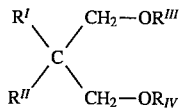

wherein $R^I$ and $R^{II}$ are the same or different and are $C_{1-18}$ alkyl, $C_{3-18}$ cycloalkyl or $C_{7-18}$ aryl radicals; $R^{III}$ and $R^{IV}$ are the same or different and are $C_{1-4}$ alkyl radicals.

Ethers of this type are described in published European patent application 361 493, corresponding to U.S. Pat. No. 5,095,153.

Representative examples of said diether compounds are 2-methyl-2-isopropyl-1,3-dimethoxypropane, 2,2-diisobutyl-1,3-dimethoxypropane, 2-isopropyl-2-cyclopentyl -1,3 -dimethoxypropane, 2-isopropyl-2-isoamyl-1,3-dimethoxypropane.

The preparation of the above mentioned catalyst components is carried out according to various methods.

For example, the magnesium halide (in anhydrous form, containing less than 1% of water), the titanium compound and the electron donor compound can be ground together under conditions that cause the activation of the magnesium halide. The finely ground product is then treated one or more times with an excess of $TiCl_4$ at a temperature ranging from 80° to 135° C., and then repeatedly washed with aliquots of a hydrocarbon (hexane, for example) until the chlorine ions have disappeared from the hydrocarbon wash solution.

According to another method, the anhydrous magnesium halide is preactivated according to known methods and then reacted with an excess of $TiCl_4$ containing dissolved therein the electron donor compound at 80° to 135° C. The treatment with $TiCl_4$ is optionally repeated and the solid is then washed with hexane or with another hydrocarbon solvent to eliminate the traces of unreacted $TiCl_4$.

According to another method, a $MgCl_2 \cdot nROH$ adduct (in particular in the form of spheroidal particles) wherein n is generally from 1 to 3, and ROH is ethanol, butanol or isobutanol, is reacted with an excess of $TiCl_4$ containing the electron donor compound in solution. The temperature generally ranges from 80° C. to 120° C. The solid is then isolated and reacted once more with excess $TiCl_4$, after which it is separated and washed with aliquots of a hydrocarbon until all chlorine ions have disappeared.

According to another method, magnesium alcoholates and chloroalcoholates (particularly the chloroalcoholates prepared according to the method described in U.S. Pat. No. 4,220,554) are reacted with an excess of $TiCl_4$ containing the electron donor compound in solution, operating under the above reaction conditions.

In the solid catalyst component the titanium compound expressed as Ti is generally present in an amount from 0.5 to 10% by weight. The quantity of electron donor compound which remains fixed on the solid catalyst component generally is 5 to 20% by moles with respect to the magnesium dihalide compound.

The titanium compounds which can be used for the preparation of the solid catalyst component are the halides and the halogen alcoholates of titanium. Titanium tetrachloride is the preferred compound.

Satisfactory results can be obtained also with titanium trihalides, particularly $TiCl_3$ HR, $TiCl_3$ ARA, and with halogen alcoholates such as $TiCl_3OR$ wherein R is a phenyl radical.

The reactions described above result in the formation of a magnesium halide in active form. Besides these reactions, other reactions are known in the literature which cause the formation of magnesium halide in active form starting from magnesium compounds other than halides, such as magnesium carboxylates, for example.

The active form of magnesium halide in the solid catalyst components can be recognized by the fact that in the X-ray spectrum of the catalyst component the maximum intensity reflection, which appears on the spectrum of the nonactivated magnesium halide (having a surface area smaller than 3 m²/g), is no longer present, but in its place there is a halo with the maximum intensity shifted with respect to the position of the maximum intensity reflection of the nonactivated magnesium dihalide, or by the fact that the maximum intensity reflection shows a width at half-peak at least 30% greater than the one of the maximum intensity reflection which appears in the nonactivated Mg halide spectrum. The most active forms are those where the above mentioned halo appears in the X-ray spectrum of the solid catalyst component.

Among the magnesium halides, the magnesium chloride is the preferred compound. In the case of the most active forms of magnesium chloride, the X-ray spectrum of the solid catalyst component shows a halo instead of the reflection which in the spectrum of the nonactivated chloride appears at a distance of 2.56 Å.

The Al-alkyl compounds used as co-catalysts comprise the Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ and $SO_3$ groups.

Examples of these compounds are:

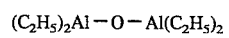

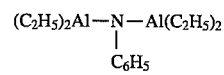

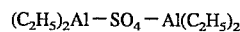

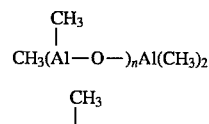

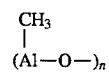

wherein n is a number from 1 to 20.

Moreover, $AlR_2OR'$ compounds, wherein R' is an aryl radical substituted in one or more positions and R is a 1–6 carbon alkyl radical, as well as $AlR_2H$ compounds, wherein R has the meaning indicated, can be used.

The Al-alkyl compound is generally used in such a quantity that the Al/Ti ratio be from 1 to 1000.

The electron donor compounds that can be used as external donors include aromatic acid esters such as alkyl benzoates, and in particular silicon compounds containing at least one Si—OR bond (R=hydrocarbon radical), 2,2,6,6-tetramethylpiperidine, and 2,6-diisopropylpiperidine.

Examples of silicon compounds are $(tert\text{-}butyl)_2$—$Si(OCH_3)_2$, $(cyclohexyl)_2Si(OCH_3)_3$, $(phenyl)_2Si(OCH_3)_2$ and $(cyclopentyl)_2Si(OCH_3)_2$. 1,3-diethers having the formula described above can also be used advantageously. If the internal donor is one of these diethers, the external donors can be omitted.

The polymerization process can be carried out in at least two sequential stages, wherein components (A) and (B) are prepared in separate subsequent stages, operating in each stage, except the first stage, in the presence of the polymer formed and the catalyst used in the preceding stage. The catalyst is added only in the first stage. However its activity is such that it is still active for all subsequent stages. Thus no catalyst is added in any subsequent stages.

The order in which components (A) and (B) are prepared is not critical.

The polymerization process can be continuous or batch, following known techniques and operating in liquid phase, in the presence or not of inert diluent, or in gas phase, or by mixed liquid-gas techniques. It is preferable to carry out the process in gas phase.

Reaction time and temperature relative to the two stages are not critical; however, it is best if the temperature is from 20° to 100° C. The regulation of the molecular weight is carried out by using known regulators, hydrogen in particular.

The catalysts can be precontacted with small quantities of alpha-olefins (prepolymerization). Prepolymerization improves both the performance of the catalysts and the morphology of the resulting polymers.

When components (A) and (B) are prepared directly by sequential polymerization, the composition of the present invention is in the form of nonextruded particles or, put another way, of as-polymerized particles, i.e. the particles from the polymerization reactor. Components (A) and (B) in these particles are optimally distributed therein, so that the composition of the present invention can be used directly for the production of heat-sealable films, sheets or laminates, without resorting to melt blending to obtain a better distribution of the copolymer components.

Preferred nonextruded compositions are in the form of spherical or spheroidal particles having a diameter from 0.5 to 4.5 mm, and more preferably with a narrow particle-size distribution, that is at least 90% of said particles have a diameter of 0.5 to 3.5 mm. Such spherical particles can be obtained, for example, using the catalysts described in U.S. Pat. No. 4,472,524.

The compositions of the present invention can contain additives, such as antioxidants, light stabilizers, heat stabilizers, colorants and fillers.

As previously mentioned, the compositions of the present invention are particularly useful for the preparation of films, sheets and laminates.

As defined herein, film is a sheet with a thickness less than 100 micrometers, while sheets and plates have a thickness greater than or equal to 100 micrometers. In the laminates of this invention at least one of the layers comprises the composition of the present invention alone or blended with polyethylene or propylene homopolymer for example. In the case of laminates, each layer that does not comprise the compositions of the present invention can be composed of other polyolefin polymers, such as polyethylene or other alpha-polyolefin homopolymer. Generally speaking, the laminates of this invention can be prepared by known techniques, such as extrusion and calendering. Specific examples of films and laminates containing the compositions of the present invention are disclosed hereinafter in the S.I.T. tests.

The following examples, which do not limit the present invention, illustrate specific embodiments of the compositions and of the sequential polymerization process for making them.

PREPARATION OF THE SOLID CATALYST COMPONENT 48 g of anhydrous magnesium chloride, 77 g of anhydrous ethyl alcohol and 830 ml of kerosene are introduced, under inert gas and at ambient temperature, into a 2 liter autoclave equipped with a turbine agitator and a drawing tube.

The content of the autoclave is heated to 120° C. under agitation thus forming the adduct between $MgCl_2$ and alcohol, which melts and remains dispersed in the kerosene.

A nitrogen pressure of 15 arm is maintained in the autoclave. The autoclave drawing tube is externally heated to 120° C. by a heating jacket, has an inside diameter of 1 mm, and measures 3 meters from one end of the heating jacket to the other.

The dispersion is then caused to flow through the tube at a velocity of about 7 m/sec. At the exit of the tube the dispersion is collected in a 5 l flask, under agitation, said flask containing 2.5 l of kerosene and being cooled externally with a jacket maintained at the initial temperature of −40° C. The final temperature of the dispersion is 0° C.

The spherical solid product which constitutes the dispersed phase of the dispersion is separated by allowing it to settle, then filtering and washing the solid with aliquots of hexane and then drying same.

All these steps are carried out in a nitrogen gas atmosphere.

130 g of the $MgCl_2.2.3C_2H_5OH$ adduct in the form of solid spherical particles having a maximum diameter of less than 50 μm are obtained. The solid adduct is dried under vacuum for two hours weighted 105 g after, the drying is complete. The solid product is heated in nitrogen flow to a temperature of about 60° C. in order to partially remove the alcohol from the adduct, thereby obtaining a $MgCl_2.2.1C_2H_5OH$ adduct. This adduct is then used to make the solid catalyst component as follows.

Into a 1 liter glass flask equipped with a condenser, mechanical agitator and thermometer, are introduced under agitation at 0° C. and in anhydrous nitrogen atmosphere, 625 ml of $TiCl_4$ and then 25 g of the $MgCl_2.2.1C_2H_5OH$ adduct.

The content of the flask is heated up to 100° C. in 1 hour. 9 mmoles of diisobutyl phthalate are introduced in the flask when the temperature reaches 40° C. The temperature is maintained at 100° C. for 2 hours, after which the content is allowed to settle and the liquid is then syphoned out. 550 ml of $TiCl_4$ are added, and it is heated to 120° C. for 1 hour. The content is then allowed to settle and the liquid is syphoned out; the solid residue is then washed 6 times with 200 cc of anhydrous hexane at 60° C. and 3 times at ambient temperature. The product is the solid catalyst component.

CATALYST SYSTEM AND PREPOLYMERIZATION TREATMENT

Before introducing it into the polymerization reactors, the solid catalyst component described above is contacted at −5° C. for 5 minutes with an aluminum triethyl (TEAL) and dicyclopentyldimethoxysilane (DCPMS), in a TEAL/DCPMS weight ratio equal to about 5 and in such a quantity that the TEAL/Ti molar ratio of the solid catalyst component equals 65.

The catalyst system is then subjected to prepolymerization by maintaining it in suspension in liquid propylene at 20° C. for about 20 minutes before introducing it into the first polymerization reactor.

EXAMPLES 1 AND 2

Into a first gas phase polymerization reactor a propylene/ethylene random copolymer [component (A)] is produced by feeding in a continuous and constant flow the prepolymerized catalyst system, hydrogen (used as molecular weight regulator) and propylene and ethylene monomers in the gas state. Polymerization conditions, molar ratio of the reactants, and composition of the copolymers obtained are shown in Table 1. The copolymer produced in the first reactor, comprising 40% by weight of the total composition, is discharged in a continuous flow and, after having been purged of unreacted monomers, is introduced in a continuous flow into the second gas phase reactor, together with the quantitatively constant flows of hydrogen and propylene, ethylene and 1-butene monomers in the gas state. The propylene/ethylene/1-butene terpolymer formed in the second reactor [component (B)] is produced in a quantity equal to 60% by weight with respect to the total composition. The conditions and molar ratios of the reactants of each example are set forth in Table 1.

The polymer composition exiting the second reactor is subjected to a steam treatment to remove the unreacted monomers and volatile substances, and then dried.

Table 1 shows the composition as well as some of the physical and chemical characteristics of the compositions obtained, which are particularly indicative of the application performances required for the compositions of the present invention. From the data in Table 1 it can be deduced that in the composition of Example 1 component (B) contains 3.23% by weight of ethylene ($C_2^-$) and 8.8% by weight of butene ($C_4^-$), while in the composition of Example 2 component (B) contains 3.53% by weight of ethylene and 7.5% by weight of butene.

COMPARATIVE EXAMPLES 3 AND 4

The composition of Comparative Example 3 was made according to the procedure of Examples 1 and 2, but without using the 1-butene as comonomer in the second reactor, thus obtaining both in the first and second reactor two propylene/ethylene copolymers in a quantity equaling 50% by weight each.

Polymerization conditions, molar ratios of monomers and characteristics of the composition obtained are shown in Table 1.

The composition of Comparative Example 4 was obtained by producing in the first reactor a propylene/1-butene copolymer in a quantity equaling 48% by weight of the total composition, and in the second reactor a propylene/ethylene copolymer in a quantity equaling 52% by weight of the total composition. Polymerization conditions, composition and characteristics are shown in Table 1.

One can clearly see that the composition of Comparative Example 3, having an extremely high content of ethylene (in addition to not containing 1-butene), is unsatisfactory due to the high amount of polymer fraction extractable with n-hexane (22% by weight, compared to 4% by weight of Examples 1 and 2).

On the other hand, the composition of Comparative Example 4, having an excessive 1-butene content is unsatisfactory as regards to the ink adhesion test (voltage values of 17.5/17.5/>20 Kvolt compared to 12.5/12.5/12.5 Kvolt of Examples 1 and 2). Moreover, also the relatively smaller values of the melting temperature, which are obtained in Comparative Examples 3 and 4, show that the compositions of said examples have processability characteristics in the film production which are remarkably worse than those of the compositions of Examples 1 and 2.

The data shown in Table 1 were obtained by using the following analytical methods.

Molar ratios of the feed gases

Determined by gas-chromatography.

Ethylene and 1-butene content of the polymers

Determined by I.R. spectroscopy.

Melt Flow Rate MFR/L

Determined according to ASTM D 1238, Condition L.

Melting temperature (Tm) and crystallization temperature (Tc)

Determined by DSC (Differential Scanning Calorimetry).

N-hexane extractables

Determined by suspending in an excess of hexane a 100 micrometer thick film specimen of the composition being analyzed, in an excess of hexane, in an autoclave at 50° C. for 2 hours. Then the hexane is evaporated and the dried residue is weighted.

Seal Initiation Temperature (S.I.T.)

Determined as follows.

Preparation of the film specimens

Some films with a thickness of 50 micrometer are prepared by extruding each test composition at about 200° C.

Each resulting film is superimposed on a 500 micrometer thick polypropylene film having an isotactic index of 97 (in boiling n-heptane) and a Melt Flow Rate of 4.5 g/10 min.

The superimposed films are bonded to each other in a plate press at 200° C. under a 9000 Kg load, which is maintained for 5 minutes.

The resulting laminates are stretched longitudinally and traversely i.e. biaxially, by a factor of 6 with a TM Long film stretcher, thus obtaining 16 micrometer thick laminate.

5×10 cm specimens are cut from this laminate.

Determination of the S.I.T.

The procedure calls for a series of seal separation tests on each film laminate test specimen.

For each test two of the above specimens are superimposed alignment, the adjacent layers being layers comprising the particular test composition. The thus superimposed specimens are sealed along one of the 5 cm side with a Sentinel Combination Laboratory Sealer, model 12-12 AS. Sealing time is 5 seconds at a pressure of 1.2 atm. and the seal width is 2.5 cm. The seal temperature is increased 2° C. for one test sample to the next sample.

Each of the thus sealed samples is then cut to obtain 2.5×10 cm test samples. In each test the unsealed longitudinal ends of the sample are attached to a dynamometer and a force equivalent to a 200 g load is applied.

The minimum seal temperature at which the seal did not break or separate under the 200 g load applied is thus determined. This is the Seal Initiation Temperature (S.I.T.) of the test composition.

Ink adhesion test

The preparation of the film to be utilized for these tests is the same as the one of the film specimens used to determine the S.I.T. Each film sample thus obtained is placed on a 1 mm thick sheet of propylene homopolymer, which in turn is positioned between two opposite circular electrodes 2.5 cm in diameter, one of which is grounded.

In an apparatus SAME a voltage up to 80 Kvolt is applied between the two electrodes with a frequency of 50 Hz, for one minute, thus producing a corona discharge.

Starting at the low end of the voltage range selected for the measurements, a set of three film samples from the same specimen is subjected to this corona treatment.

A second set of three film samples is subjected to this corona treatment, but with the voltage increased.

Subsequent sets are so treated until the end of the voltage range is reached.

On the same day as the corona treatment, one member of each set is subjected to the inking and adhesive tape removal test procedure. Twenty-four hours after the corona treatment, another member of each set is subjected to said test procedure; and seven days after the corona treatment the last member of the set is subjected to said test procedure.

In the inking and adhesive tape removal procedure, a single component ink is applied by means of a rubber roller to the corona treated surface of the sample. The ink is white MR57 marketed by Siegwerk, which comprises a mixture of solvents (ethanol or ethyl acetate), nitrocellulose, various pigments, polyurethane, slip agents, and adhesion promoters.

After drying the ink at ambient temperature for 1 hour, the adhesion of the ink to the corona treated surface is measured by adhering a strip of adhesive tape to the inked surface of the film and then pulling it away from the surface. The amount of ink remaining on the part of the surface that was in contact with the adhesive tape is then measured and the percentage thereof compared to the amount of ink that was on the surface prior to the tape removal is determined.

By comparing the percentages of ink remaining in order of increasing voltage, the voltage at which the percentage first reaches 80% or the minimum voltage is determined. This is the ink adhesion property of the film.

This ink adhesion value, expressed in Kvolts, are the three numbers reported for Ink Adhesion in Table 1. The first number of the three numbers reported for each sample set is the minimum voltage for ink adhesion for the same day as the corona treatment, the second number is after 24 hours from the corona treatment minimum voltage, and the third number is after 7 days from the corona treatment minimum voltage.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

TABLE 1

| EXAMPLES | 1 | 2 | 3 (comp) | 4 (comp) |
| --- | --- | --- | --- | --- |
| 1st REACTOR | | | | |
| Temperature, °C. | 65 | 65 | 65 | 65 |
| Pressure, kg/cm$^2$ | 16 | 16 | 16 | 16 |
| $H_2/C_3^=$, mol | 1.45 | 0.04 | 0.04 | 0.011 |
| $H_2/C_2^=$, mol | 33.53 | 1.02 | 0.66 | — |
| $C_2^=/C_2^= + C_3^=$, mol | 0.04 | 0.04 | 0.056 | — |
| $C_4^=/C_4^= + C_3^=$, mol | — | — | — | 0.272 |
| RESULTING POLYMER | | | | |
| MFR/L, g/10 min | 5.9 | 5.8 | 6.1 | 6.0 |
| $C_2^=$, % weight | 2.9 | 3.2 | 5.2 | — |
| $C_4^=$, % weight | — | — | — | 15.5 |
| 2nd REACTOR | | | | |
| Temperature, °C. | 65 | 65 | 65 | 70 |
| Pressure, kg/cm$^2$ | 16 | 16 | 16 | 16.7 |
| $H_2/C_3^=$, mol | 0.10 | 0.10 | 0.137 | 0.048 |
| $H_2/C_2^=$, mol | 2.73 | 2.47 | 1.300 | 1.253 |
| $C_2^=/C_2^= + C_3^=$, mol | 0.04 | 0.04 | 0.095 | 0.037 |
| $C_4^=/C_4^= + C_3^=$, mol | 0.14 | 0.13 | — | — |
| TOTAL COMPOSITION | | | | |
| MFR/L, g/10 min | 5.9 | 6.1 | 5.8 | 5.8 |
| $C_2^=$, % weight | 3.1 | 3.4 | 7.9 | 2.4 |
| $C_4^=$, % weight | 5.3 | 4.5 | — | 7.5 |
| $T_m/T_c$, (DSC) °C. | 143/91 | 139/93 | 130/86 | 133/92 |
| S.I.T., °C. | 104 | 108 | 102 | 104 |

TABLE 1-continued

| EXAMPLES | 1 | 2 | 3 (comp) | 4 (comp) |
|---|---|---|---|---|
| Ink adhesion Kvolt | 12.5/12.5/12.5 | 12.5/12.5/12.5 | 12.5/12.5/12.5 | 17.5/17.5/>20 |
| Extractables in hexane % weight | 3.6 | 3.9 | 22.0 | 4.0 |

We claim:

1. A crystalline propylene copolymer composition comprising (percent by weight):
   A) 20–60% of a copolymer of propylene with ethylene, containing 1% to 5% of ethylene; and
   B) 40–80% of a copolymer of propylene with ethylene and a $C_4$–$C_8$ alpha-olefin, the ethylene content being 1% to 5% and the $C_4$–$C_8$ alpha-olefin content being 6% to 15%; the total content of ethylene in the composition being 1% to 5% and the total content of $C_4$–$C_8$ alpha-olefin in the composition being 2.4% to 12%,
said composition being prepared by sequential polymerization in at least two stages.

2. The composition of claim 1 comprising (percent by weight):
   A) 30–50% of a copolymer of propylene with ethylene, containing 2 to 4% of ethylene; and
   B) 50–70% of a copolymer of propylene with ethylene and a $C_4$–$C_8$ α-olefin, the ethylene content being 2% to 4%, and the $C_4$–$C_8$ α-olefin content being 7% to 12%;
the total content of ethylene in the composition being 2% to 4% and the total content of $C_4$–$C_8$ α-olefin in the composition being 3.5% to 8.4%.

3. The composition of claim 1, wherein the $C_4$–$C_8$ α-olefin is selected from the group consisting of 1-butene, 1-pentene, 1-hexene, 4-methyl-1-pentene and 1-octene.

4. Sheets and plates of the composition of claim 1.

5. An ink printable film of the composition of claim 1.

6. An ink printable laminate, the ink printable layer of which being comprised of the composition of claim 1.

7. Sheets and plates of the composition of claim 2.

8. An ink printable film of the composition of claim 2.

9. An ink printable laminate, the ink printable layer of which being comprised of the composition of claim 2.

10. A process for the preparing the composition of claim 1, which comprises polymerizing the propylene and ethylene monomers in a first stage in the presence of a stereospecific catalyst supported on a magnesium dihalide in active form, and propylene, ethylene and α-olefin monomers in at least another separate and successive stages, in the presence of the polymer formed and the catalyst used in the preceding stage.

11. The process of claim 10, wherein the polymerization stages are carried out in gas phase.

* * * * *